United States Patent [19]

Akabane et al.

[11] Patent Number: 4,775,898

[45] Date of Patent: Oct. 4, 1988

[54] DISPLAY DEVICE IN A VIDEO INSTRUMENT

[75] Inventors: Jun Akabane, Tokyo; Tetsuya Yamamoto, Hasuda, both of Japan

[73] Assignee: Nippon Kogaku K. K., Tokyo, Japan

[21] Appl. No.: 84,810

[22] Filed: Aug. 13, 1987

[30] Foreign Application Priority Data

Aug. 22, 1986 [JP] Japan .................. 61-127919[U]
Feb. 5, 1987 [JP] Japan .................. 62-16062[U]

[51] Int. Cl.$^4$ .................................. H04N 5/76
[52] U.S. Cl. ........................ 358/335; 358/906; 358/909; 360/35.1
[58] Field of Search ............ 358/335, 342, 906, 909; 360/10.1, 35.1

[56] References Cited

U.S. PATENT DOCUMENTS

| | | | |
|---|---|---|---|
| 4,420,773 | 10/1983 | Toyoda et al. | 358/335 |
| 4,456,931 | 4/1984 | Toyoda et al. | 358/335 |
| 4,481,543 | 11/1984 | Saite | 360/35.1 |
| 4,647,987 | 3/1987 | Nutting | 358/906 X |
| 4,658,301 | 8/1987 | Toyoda et al. | 379/100 |

Primary Examiner—L. T. Hix
Assistant Examiner—D. Rutledge
Attorney, Agent, or Firm—Shapiro and Shapiro

[57] ABSTRACT

A visual display device in a video instrument capable of alternatively setting the frame mode and the field mode comprises display means having a display area, means for driving the display means by a first display mode in which a plurality of patterns are displayed while being distributed at a predetermined density in the display area and a second display mode in which a plurality of patterns are displayed while being distributed at a density lower than the predetermined density in the display area, and means for selecting the first display mode when the frame mode is set, and selecting the second display mode when the field mode is set.

6 Claims, 6 Drawing Sheets

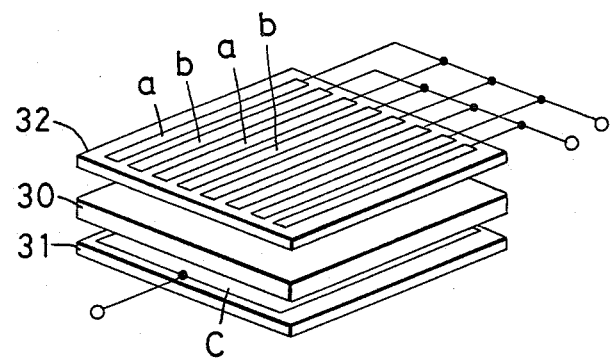
FIG. 11
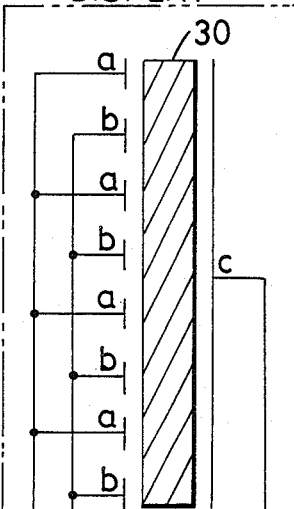
FIG. 12
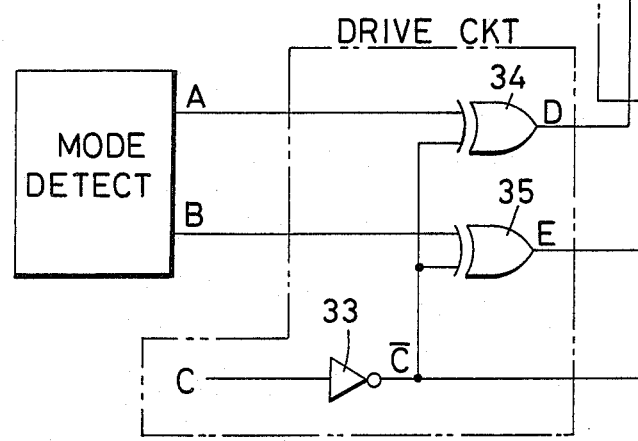

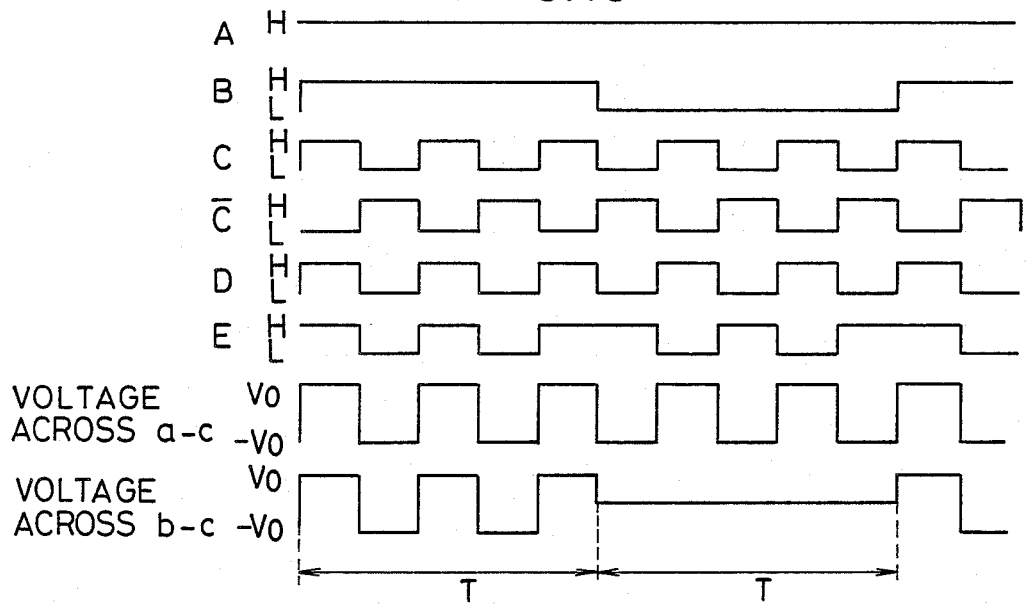
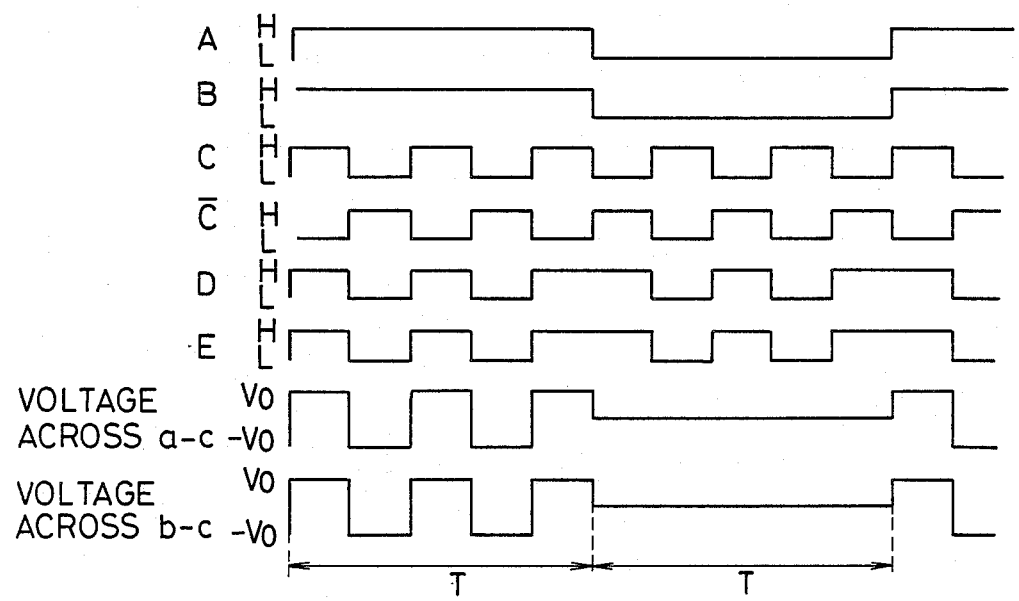

DISPLAY DEVICE IN A VIDEO INSTRUMENT

BACKGROUND OF THE INVENTION

1. Field of the Invention

This invention relates to a video instrument dealing with video signals such as television signals and having two modes, i.e., the frame mode (the frame recording or the reproduction from a medium by the frame recording) and the field mode (the field recording or the reproduction from a medium by the field recording), such as, for example, an electronic still camera, a reproducing apparatus for reproducing recorded images photographed by the electronic still camera, an image telephoto apparatus for transmitting images photographed by the electronic still camera to remote places over a telephone communication net work or the like, or a receiver for receiving the signals transmitted by the image telephoto apparatus and printing them.

2. Related Background Art

Electronic still cameras for forming the image of an object to be photographed on an image pickup device such CCD, converting it into an image signal and recording the image signal in a memory device for each still picture are shown, for example, in U.S. Pat. Nos. 4,420,773 and 4,456,931. Also, an apparatus for reading optical images by a linear image sensor from a film on which the optical images are visually recorded, converting the optical images into image data and transferring the data through a telephone cable is known, for example, from U.S. Pat. No. 4,658,301.

In the video instruments as described above, there are two types, i.e., the frame recording system and the field recording system.

The frame recording system is a recording system wherein a still picture is constituted by the scanning of all scanning lines on the screen of a television set, and the field recording system is a recording system wherein a still picture is constituted by the scanning of only the odd-number or even-number scanning lines of all scanning lines. These two systems as designed such that the operator can select and set them as desired. Also, in the reproducing apparatus, it is necessary to automatically detect whether the image being currently reproduced is by the frame recording or by the field recording, automatically set it and display the distinction. Further, as regards a telephoto apparatus, in the transmitter apparatus thereof, it is necessary to automatically detect whether the image to be now transmitted is by the frame recording or by the field recording, automatically set it and display the distinction on the apparatus itself or insert it into the transmitted signals and transmit it with the transmitted images, and in the receiver apparatus thereof, it is necessary to automatically detect whether the received image is by the frame recording or by the field recording, and print and display the distinction proximately to the reproduced image on paper printed out by a printer.

However. since the initials of field and frame both are "F", the display by the initial cannot be used, but display such as "FIELD" and "FRAME" must unavoidably be adopted.

Such display as mentioned above does not permit the content thereof to be read at a glance because it cannot be judged until all the letters have been read, and on the part of the operator, this has led to a problem that the display is difficult to discriminate in a moment.

SUMMARY OF THE INVENTION

It is the object of the present invention to provide, in a video instrument having the frame mode and the field mode and capable of automatically or manually set any of the two modes alternatively, a display device capable of discriminating in a movement which mode is set.

The display device of the present invention includes a number of display elements distributed in a display area. The elements each comprise a straight or curved thin pattern or a dot-like pattern and are repetitively arranged in the display area. By these display elements being all or selectively display-driven, dense visual display is effected in the frame mode or sparse visual display is effected in the field mode. Thereby, discrimination of the mode can be visually accomplished in a moment.

Preferably, the sparseness or denseness of the display is made to substantially coincide with the sparseness or denseness of the recording. Thereby the distinction between the field mode and the frame mode can be naturally discriminated in a moment.

BRIEF DESCRIPTION OF THE DRAWINGS

FIG. 11 is an exploded perspective view of the display device.

FIG. 12 is a block diagram showing an example of a liquid crystal drive circuit.

FIGS. 13, 14, 15 and 16 are time charts showing the drive modes of the circuit of FIG. 12.

DESCRIPTION OF THE PREFERRED EMBODIMENTS

Figure 1:
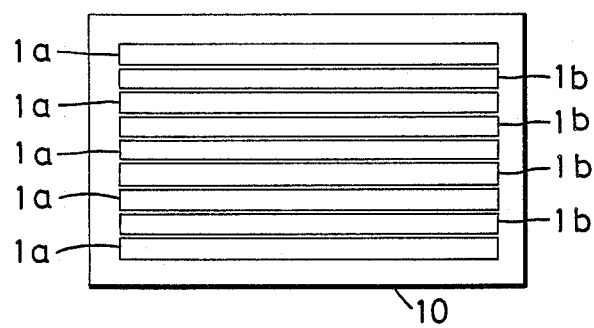
FIG. 1 is a plan view of a display device according to a first embodiment of the present invention.

The display device of FIG. 1 has a number of straight display elements arranged parallel in a horizontal direction on a substrate 10. The display elements are arranged in a rectangular display area and together form a display unit.

The display elements each are comprised, for example, of a liquid crystal display element or an electrochromic element, and are classfied into an odd-number element group 1a and an even-number element group 1b.

Figure 2A:
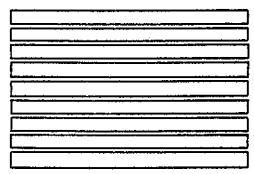
FIGS. 2A and 2B show the displays of the frame mode and the field mode, respectively by the display device of FIG. 1.
Figure 2B:
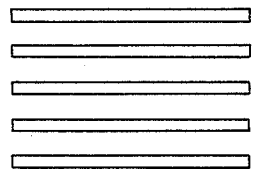

When the frame recording is selected, the element groups 1a and 1b are all used to effect dense display as shown in FIG. 2A. When the field recording is selected, only the odd-number element group 1a is used to effect sparse display as shown in FIG. 2B.

Of course, when the field recording is selected, only the element group 1b may be used to effect display.

Figure 3:
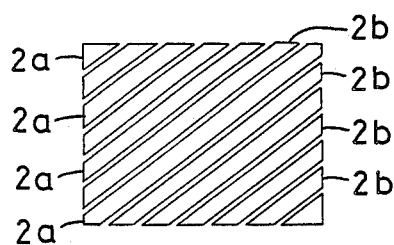
FIGS. 3, 4, 5 and 6 show the displays by second, third, fourth and fifth embodiments, respectively, of the present invention.

FIG. 3 shows a number of oblique straight elements arranged repetitively. When the frame recording is recorded, both element groups 2a and 2b are all used to effect dense display, and when the field recording is selected, only one of the groups, 2a (or 2b), is used to effect sparse display.

Figure 4:
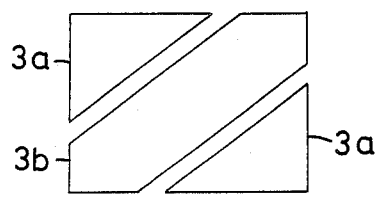

The arrangement of FIG. 4 is basically the same as the arrangement of FIG. 3, but the number of oblique straight elements is minimum three. When the frame recording is selected, elements 3a and 3b are all used to effect display, and when the field recording is selected, only the elements 3a are used.

Figure 5:
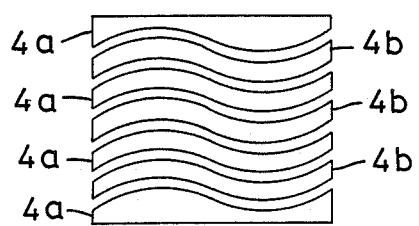

FIG. 5 shows curved display elements arranged repetitively. When the frame recording is selected, odd-number and even-number curved element groups 4a and 4b are all used to effect dense display. When the field recording is selected, only the odd-number curved element group 4a (or only the even-number curved element group 4b) is used to effect sparse display.

Figure 6:
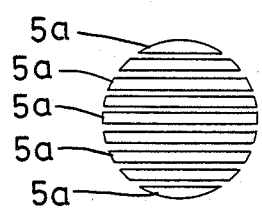

FIG. 6 shows an embodiment in which the shape of the display area is circular. When the frame recording is selected, all the display elements are used to effect dense display. When the field recording is selected, only the display elements 5a are used.

Figure 7A:
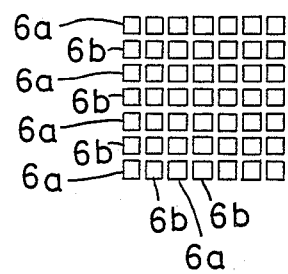
FIGS. 7A and 7B show the displays of the frame mode and the field mode, respectively, by a sixth embodiment of the present invention.
Figure 7B:
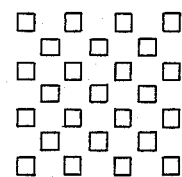

FIGS. 7A and 7B show the displays in a case where display elements are formed in the shape of rectangular dots. The dot elements are arranged in the form of a matrix. The dots which are not adjacent to one another in the vertical and horizontal directions are divided into two groups, and when the frame recording is selected, both groups of dot elements 6a and 6b are all used to effect dense display as shown in FIG. 7A. When the field recording is selected, only one group of dot elements 6a is used to effect sparse display as shown in FIG. 7B.

Figure 8A:
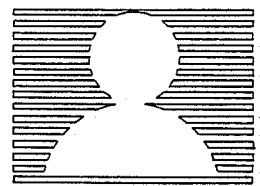
FIGS. 8A and 8B show the displays of the frame mode and the field mode, respectively, by a seventh embodiment of the present invention.
Figure 8B:
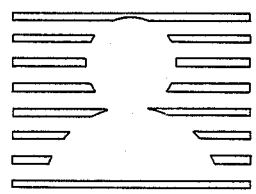

As shown in FIGS. 8A and 8B, a shadow-picture-like portion by an omitted portion of any shape may be provided within the display area. FIG. 8A refers to a case where the frame recording is selected, and FIG. 8B refers to a case where the field recording is selected.

In the above-described embodiments, design has been made such that the number of display elements used during the field recording is about one-half of the number of display elements used during the frame recording, whereas the present invention is not restricted thereto, but the display may only be such that the display during the field recording is felt to be sparser than the display during the frame recording. However, since the recording density of the field recording is ½ of the recording density of the frame recording, it is generally considered to be preferable that the density of display be about ½ in accordance therewith.

Also, the above-described displays can be applied in common to an electronic still camera, a reproducing apparatus and a telephoto apparatus.

The display unit is not limited to a liquid crystal element or an electrochromic element, but may be comprised of a CRT, a printer or other various types of display elements.

Figure 9:
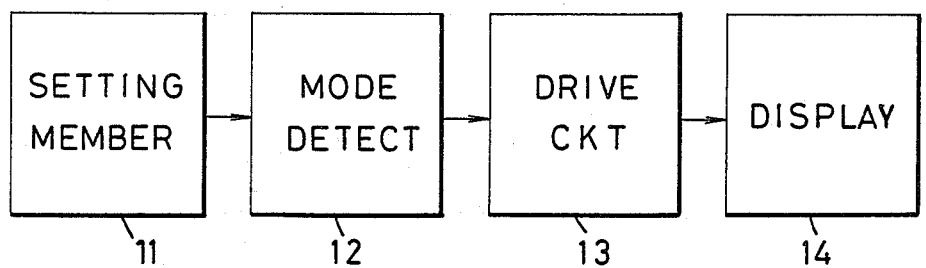
FIG. 9 is a block diagram showing an embodiment of the display drive device.

FIG. 9 schematically shows the entire display device including a driving device. The display device of FIG. 9 is suitable for an electronic still camera or an image telephoto apparatus, and when the field mode or the frame mode is set by a setting member 11, a mode detecting circuit 12 detects the set mode and outputs a detection signal, and a driving circuit 13 drives a display unit 14 provided in the viewfinder of a camera or in the housing of a camera or a telephoto apparatus by the signal from the mode detecting circuit 12.

Figure 10:
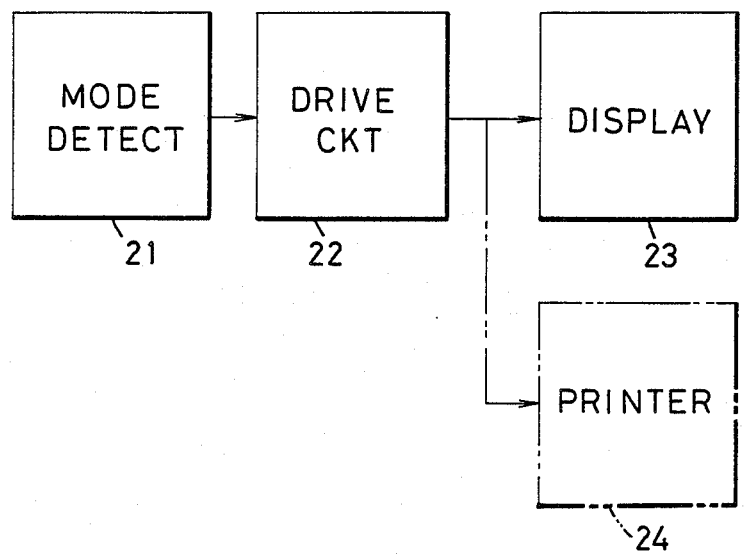
FIG. 10 is a block diagram showing another embodiment of the display drive device.

FIG. 10 schematically shows the construction of a display device suitable for the reproducing apparatus of an electronic still camera or the receiver of an image telephoto apparatus. A mode detecting circuit 21 discriminates whether the photographing of the electronic still camera or the transfer of the image telephoto apparatus is by the field mode or by the frame mode. By making design such that with the image signal from the electronic still camera or the image telephoto apparatus, a mode identification signal is transferred, the mode detecting circuit 21 can determine the drive mode by a drive circuit 22 in response to the mode identification signal. The drive circuit 22 drives a display unit 23 observably provided in the housing of the reproducing apparatus or the receiver.

The drive circuit 22, as indicated by phantom line, may drive a printer for printing the reproduced or received image and display it with the object image on printing paper.

FIGS. 11 and 12 show a specific example of the construction of the display unit. A liquid crystal layer 30 is interposed between a substrte 31 and a transparent substrate 32, and a common electrode c is provided on the substrate 31, and a transparent electrode group a corresponding to the odd-number display elements of the display unit and a transparent electrode group b corresponding to the even-number display elements of the display unit are provided on the substrate 32.

Figure 13:
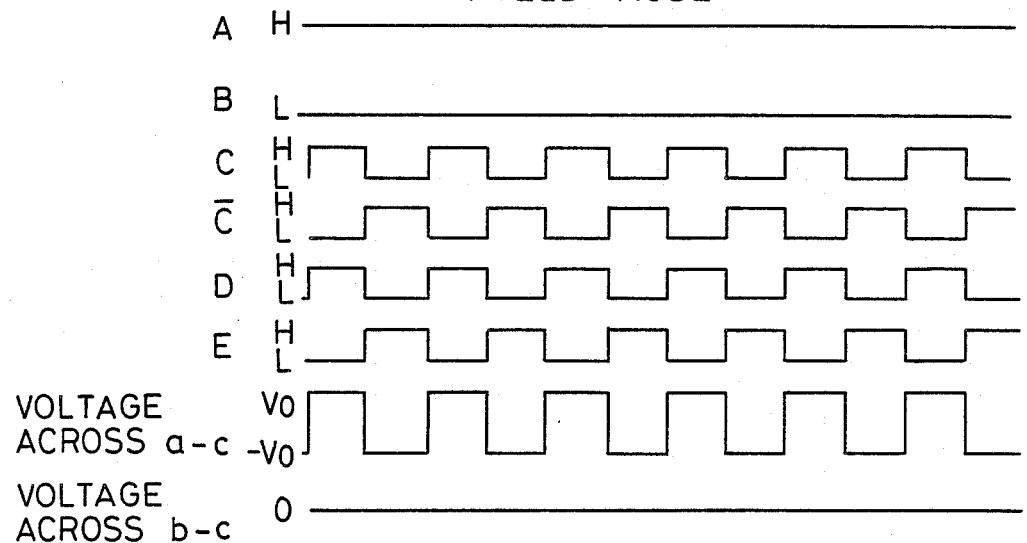
Figure 14:
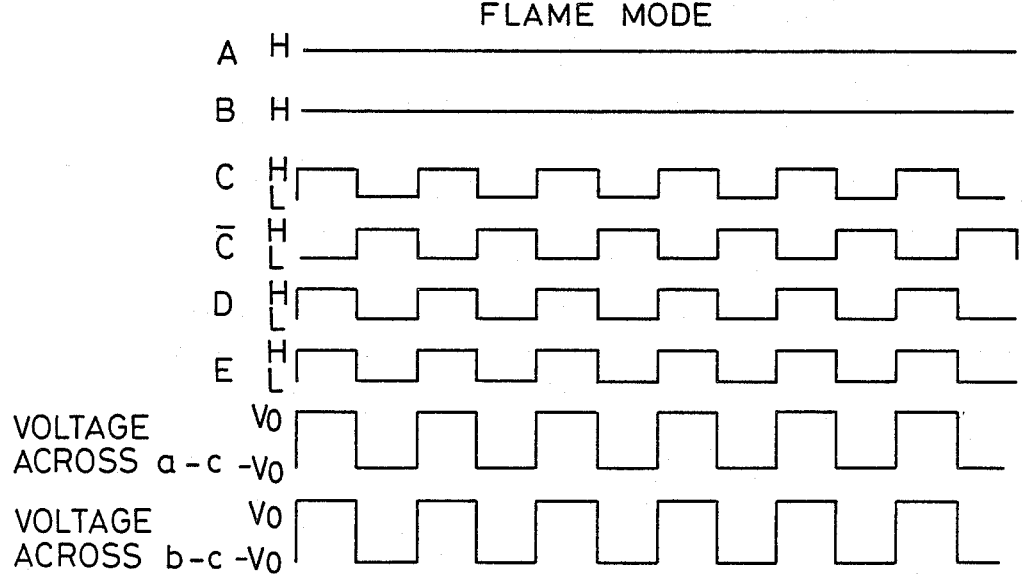

The liquid crystal layer 30 is statically driven by the drive circuit of FIG. 12. An AC signal C as shown in FIGS. 13 or 14 is input to the input of an inverter 33. From the mode detecting circuit, two control signals A and B are produced correspondingly to the detected mode. The control signals A and B are at "H" (Vo) level and "L" (O) level, respectively, as shown in FIG. 13 in the case of the field mode, and are at "H" (Vo) level and "H" (Vo) level, respectively, as shown in FIG. 14 in the case of the frame mode.

When the field mode is first detected, the control signal A is at "H" level and the control signal B is at "L" level and therefore, the voltage applied to the transparent electrode group a, i.e., the output D of an exclusive OR circuit 34, and the voltage applied to the transparent electrode group b, i.e., the output E of an exclusive OR circuit 35, are such as shown in FIG. 13.

On the other hand, the voltage applied to the common electrode c, i.e., the output C of the inverter 33, is such as shown. Consequently, an AC waveform voltage of amplitude 2Vo is applied between the electrode group a and the common electrode c, and a DC voltage of "L" (O) is input between the electrode group b and the common electrode c. Therefore, only the display elements corresponding to the transparent electrode group a are driven and the field display is realized.

Next, when the frame mode is detected, both of the control signals A and B assume "H" level, and the output D applied to the transparent electrode group a and the output E applied to the transparent electrode group b become such as shown in FIG. 14. Consequently, an AC waveform voltage of amplitude 2Vo is applied both between the electrode group a and the common electrode c and between the electrode group b and the common electrode c, and all the display elements are driven and the frame display elements are driven and the frame display is realized.

Further, an example in which this display device is used to display the recording situation of a recording disc in which the field recording and the frame recording are mixedly present will be shown below. FIG. 15 shows an example in which the sparse display showing the field recording and the display showing the frame recording are alternately displayed, and FIG. 16 shows an example in which the dense display showing the frame recording and the non-display (turn-off) are alternately repeated.

The example shown in FIG. 15 will hereinafter be described.

The control signal A is at "H" level and the control signal B repeats "H" and "L" levels at a period T in synchronism with the rising of the control signal C. Thereupon, an AC waveform voltage of amplitude 2Vo is input between the electrode group a and the common electrode c and an AC waveform voltage of amplitude 2Vo and O voltage are alternately input between the electrode group b and the common electrode c at a period T. Therefore, the display elements corresponding to the electrode group a are turned on and the display elements corresponding to the electrode group b repeat turn-on and turn-off at a period T.

A circuit for outputting the signal waveform shown in FIG. 15 is well known and therefore need not be described in detail herein.

The frme display and the field display are alternately effected in this manner, whereby informing the operator that the field recording and the frame recording are mixedly present.

FIG. 16 shows another example showing the recorded state of a disc in which the field recording and the frame recording are mixedly present, and both of the control signals A and B repeat "H" and "L" in synchronism with the rising of the control signal C at a period T. Therefore, turn-on and turn-off are repeated at a period T both across the electrodes a–c and across the electrodes b–c (so-called blinking operation), whereby informing the operator that the field recording and the frame recording are mixedly present.

We claim:

1. A visual display device in a video instrument capable of alternatively setting the frame mode and the field mode, comprising:
   display means having a display area;
   means for driving said display means by a first display mode in which a plurality of patterns are displayed while being distributed at a predetermined density in said display area and a second display mode in which a plurality of patterns are displayed while being distributed at a density lower than said predetermined density in said display area; and
   means for selecting said first display mode when said frame mode is set, and selecting said second display mode when said field mode is set.

2. A visual display device according to claim 1, wherein said display means includes a display unit having a plurality of display elements distributed and arranged in said display area, and said driving means drives all the display elements of said display unit in said first display mode, and drives a selected portion of the display elements of said display unit in said second display mode.

3. A visual display device according to claim 2, wherein said plurality of display elements are regularly arranged in said display area.

4. A visual display device according to claim 3, wherein each of said plurality of display elements is formed in a linear shape extending in a predetermined direction.

5. A visual display device according to claim 3, wherein said plurality of display elements are a number of dots arranged along a predetermined matrix.

6. A visual display device according to claim 3, wherein each of said plurality of display elements is formed in the shape of a curved line extending in a predetermined direction.

* * * * *